Patented May 7, 1935

2,000,317

UNITED STATES PATENT OFFICE 2,000,317

SOY BEAN FLOUR

William B. Bishop, Decatur, Ill., assignor to A. E. Staley Manufacturing Company, Decatur, Ill., a corporation of Delaware No Drawing. Application March 2, 1933, Serial No. 659,347

3 Claims. (Cl. 99—11)

This invention relates to the production of an edible soy bean flour and has for its object the production of an improved soy bean flour of low oil and high protein content. Prior to the instant invention soy bean flours generally upon the market have contained from 20% to 25% of oil or fat. The presence of such a large percentage of oil or fat reduces materially the percentage of protein so that the flour contains less body building constituents. Furthermore, the oil or fat thus contained in soy bean flour has a tendency to become rancid after a period of from one to three months.

Prior to this invention commercial processes employed for the extraction of the oil have either been too expensive or have produced a cake from which edible flour could not be produced satisfactorily. Processes have been known, in which organic solvents, such as gasoline, benzene, or carbon tetrachloride have been used to extract the oil. Such processes have been expensive and have only been usable in batch operations. Moreover, processes employing organic solvents have removed both the coloring matter and other valuable constituents, such as lecithin, and have left the flour light in color and lacking in the nutty flavor so desirable in soy bean flour.

Where the oil has been extracted in expellers, it has heretofore been customary to heat the cake to a high temperature in the extraction of the oil, with the result that the resulting flour was brown in color, was possessed of a burned taste, and the proteins contained have been considerably altered by denaturing due to the heating.

This invention has for its principal object the provision of a soy bean flour of low oil content, from which objectionable tastes and odors have been removed, but which otherwise has all the physical and chemical characteristics of a flour made from the whole beans.

Numerous other objects and advantages of the invention will be apparent as it is better understood from the following description.

The process embodying my present invention is as follows: The whole beans are first cleaned and dehulled. They may then be treated to remove objectionable tastes and odors, preferably by the process described and claimed in copending application, Serial No. 639,044, filed October 22, 1932, for improvement in the treatment of soy beans, and assigned to A. E. Staley Manufacturing Company, a corporation of the State of Illinois, assignee of this application.

In accordance with this process the moisture content of the beans is materially increased and the beans are subjected for a short period of time to a high temperature, then first sharply reducing the temperature. Later, final cooling and drying are accomplished. The beans are dried preferably to an extent leaving 4% to 6% of moisture in the beans. Thereafter the beans are ground to approximately 10–20 mesh, heated to a temperature of approximately 200° to 220° F., and passed through an expeller to extract the oil content down to 7% or 8% or lower. Care is taken to maintain the ground beans at relatively low temperatures during the expelling to prevent scorching or browning which materially alters the color and taste of flour made from the final cake. A low temperature is maintained by cooling parts of the expeller itself by water at 90° to 120° F., and by passing the beans through the expeller at high speed and at sufficiently low pressure to prevent browning of the resultant cake. Thereafter, the cake is quickly cooled. This is accomplished by breaking up the cake and spreading it out for large direct contact with the air. Flour ground from the cake has the rich yellow color of flour from the whole bean and the taste of the bean, except for the objectionable tastes and odors earlier removed, is preserved. The protein content is materially higher than the protein content of the flours now usually made and which contain from 20% to 25% of oil.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

I claim:

1. The process for preparing soy bean flour, which comprises increasing the normal moisture content of soy beans, subjecting the moist beans to a relatively high temperature for a short period of time, drying said beans at a reduced temperature, expelling oil from the dried beans at a relatively low temperature, and grinding the expelled beans into flour form.

2. The process of treating soy beans to produce flour therefrom, which comprises treating soy beans to remove undesirable flavor and odor therefrom, subjecting the beans to an expelling step under sufficient pressure to press out substantial quantities of the oil content thereof, reducing the temperature of the beans during the expelling step, and grinding the expelled beans into flour form.

3. The process for producing flour from soy beans, which comprises increasing the moisture content of the beans without extracting the natural color therefrom, subjecting the beans to a relatively high temperature for a short period to remove undesirable tastes and odors, reducing the temperature before the color of the beans has been materially affected, subjecting the beans to an expelling step at a temperature sufficiently low that the color of the beans will not be materially increased, and grinding the beans into flour form.

WILLIAM B. BISHOP.